United States Patent [19]

Pabst et al.

[11] Patent Number: 4,562,023
[45] Date of Patent: Dec. 31, 1985

[54] PROCESS AND APPARATUS FOR PRODUCING A SYNTHETIC RESIN SHEET HAVING A COLORED BAND OF VARYING COLOR INTENSITY

[75] Inventors: Horst Pabst, St. Augustin-Hangelar; Hans Brinkmann, Troisdorf, both of Fed. Rep. of Germany

[73] Assignee: Dynamit Nobel Aktiengesellschaft, Troisdorf, Fed. Rep. of Germany

[21] Appl. No.: 545,239

[22] Filed: Oct. 25, 1983

Related U.S. Application Data

[63] Continuation-in-part of Ser. No. 405,405, Aug. 5, 1982, Pat. No. 4,476,075.

[30] Foreign Application Priority Data

Aug. 18, 1981 [DE] Fed. Rep. of Germany ....... 3132509
Oct. 27, 1982 [DE] Fed. Rep. of Germany ....... 3239782

[51] Int. Cl.[4] .............................................. B29F 3/10
[52] U.S. Cl. ...................................... 264/75; 264/171; 264/245; 425/131.1; 425/133.5; 425/146; 425/462
[58] Field of Search .................... 264/171, 75, 245; 425/133.5, 131.1, 462, 146, 465–466, 381

[56] References Cited

U.S. PATENT DOCUMENTS

| | | | |
|---|---|---|---|
| 1,603,812 | 10/1926 | Stein | 264/171 |
| 2,696,640 | 12/1954 | Wienand | 264/171 |
| 2,709,834 | 6/1955 | Johnson | 425/131.1 |
| 3,354,025 | 11/1967 | Aykanian et al. | 264/245 |
| 3,405,425 | 10/1968 | Buckley et al. | 425/133.5 |
| 3,443,278 | 5/1969 | Nauta | 425/131.1 |
| 3,770,357 | 11/1973 | Gibney | 425/131.1 |
| 3,799,718 | 3/1974 | Kiyono et al. | 425/131.1 |
| 4,128,386 | 12/1978 | Wissinger et al. | 425/131.1 |
| 4,185,951 | 1/1980 | Webermeier et al. | 425/133.5 |
| 4,316,868 | 2/1982 | Esposito et al. | 425/131.1 |

FOREIGN PATENT DOCUMENTS

| | | | |
|---|---|---|---|
| 42289 | 11/1973 | Australia | 425/133.1 |
| 3132509 | 3/1983 | Fed. Rep. of Germany | 425/133.5 |
| 55-109643 | 8/1980 | Japan | 264/171 |
| 55-135642 | 10/1980 | Japan | 425/133.5 |
| 56-00125 | 1/1981 | Japan | 425/146 |
| 56-150544 | 11/1981 | Japan | 264/171 |

*Primary Examiner*—Jeffery Thurlow
*Attorney, Agent, or Firm*—Antonelli, Terry & Wands

[57] ABSTRACT

Process and apparatus for producing a sheet or film exhibiting a colored band of varying color intensity, with an extruder for melting a stream of a thermoplastic synthetic resin and with a slot die tool (e.g. a fishtail die) having a distributor duct with a throttle zone arranged upstream thereof, a back pressure plate or restrictor bar, and a nozzle orifice, wherein a colorless melt stream and a dyed melt stream are respectively shaped into a sheet having the desired width and are melted together prior to exiting from the die tool along a lateral edge to form one sheet; and wherein along a predetermined width, calculated from a transition line of the dyed sheet, a wedge-like extending color band made up of a partial stream of the dyed melt stream is introduced into the zone of the colorless sheet by way of a slot die having a wedge-like orifice and being arranged in the extrusion direction upstream of the back pressure plate and downstream of the distributor duct, with a corresponding displacement of the colorless melt stream.

8 Claims, 11 Drawing Figures

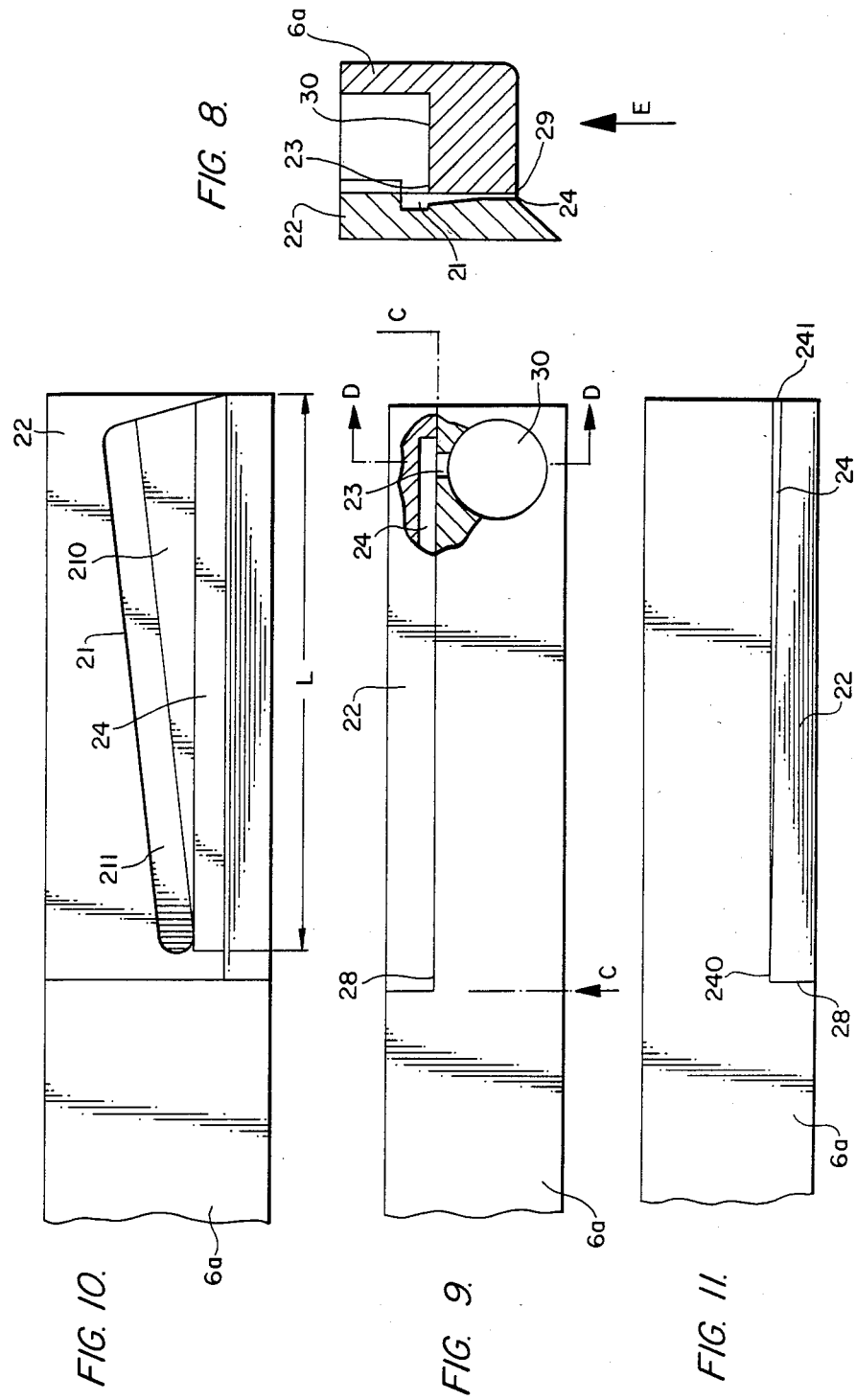

PROCESS AND APPARATUS FOR PRODUCING A SYNTHETIC RESIN SHEET HAVING A COLORED BAND OF VARYING COLOR INTENSITY

CROSS-REFERENCE TO RELATED APPLICATION

This application is a continuation-in-part of application Ser. No. 405,405, filed Aug. 5, 1982, which application has now issued as U.S. Pat. No. 4,476,075, Oct. 9, 1984.

This invention concerns a process for producing a sheet or film exhibiting a colored band of varying color intensity, wherein a melt stream of a thermoplastic synthetic resin which is colorless (that is free of pigment and dye to appear transparent) and plasticized in an extruder, is fed to a slot die and spread out by way of a distributor duct with a throttle zone in the transverse direction to the sheet extrusion direction, and then traverses, in parallel to the extrusion direction, a height-adjustable forward zone up to a nozzle orifice, and wherein another melt stream of dyed or colored thermoplastic synthetic resin is injected into this melt stream upstream of the nozzle orifice to provide the colored band of varying color intensity.

The apparatus for producing sheeting containing a colored band is based on an extruder for melting a colorless stream of thermoplastic synthetic resin and a slot die with a distributor duct with a throttle zone located upstream thereof, a back pressure plate, a forward zone formed between an upper lip and a lower lip including a nozzle orifice to shape the sheeting, wherein the slot die furthermore comprises an injection port or die means for introducing an additional, thermoplastic partial melt stream which is colored or dyed.

A process is known from DOS [German Unexamined Laid-Open application] No. 2,035,578 for the production of a sheet having a colored band of varying color intensity wherein the stream of dyed synthetic resin is injected at a point in time during which the main stream is still spreading in the transverse direction. The injection of the dyed melt stream herein takes place in the zone of the distributor duct, whereby the dyed melt stream is likewise spread apart and distributed additionally in the transverse direction with respect to the extrusion direction.

A similar process and apparatus is known from European Laid-Open application No. 0 052 491 wherein a dyed melt is injected, to form a colored band, into a colorless melt stream so that the colored band is completely incorporated into the colorless melt. For this purpose, a torpedo-like probe is provided arranged with the extrusion duct and being surrounded on all sides by a flow of colorless melt.

In the production of transparent sheeting or films dyed in partial zones, as utilized, for example, as interlayer films for automobile safety glass, it is necessary to provide an exactly defined and dimensioned transition zone from a colorless portion into a dyed portion with a continuous transition of color intensity; such sheets furthermore are to be manufactured so that the sheets can be reproduced with identical quality. One disadvantage of the process according to DOS No. 2,035,578 is to be seen in that it is very difficult to exactly control the desired colored band in cross section, spread, dimensioning, and color intensity, since the dyed composition is injected in the distributor duct and subsequently is still subject to spreading at right angles to the extrusion direction. Also, according to the process carried out with the apparatus of European Laid-Open application No. 0 052 491, it is difficult to maintain the desired, exact dimensioning and course of the color gradient, since the dyed melt is injected within a stream of colorless composition all around, displacing this stream; and in such a process even minor fluctuations in pressure relationships will lead to differing colored bands with respect to intensity and dimensioning. However, pressure fluctuations cannot be entirely avoided on the side of the extruder; such fluctuations, though, cannot be compensated by the process and apparatus of EP-OS No. 0 052 491 with respect to the position of the colored band.

The invention is based on the object of providing a process and apparatus making it possible to manufacture in a simple way, and reproducible in identical quality, sheeting having a colored band of varying color intensity, as known, for example, in the form of dyed safety glass films made of polyvinyl butyral.

The invention proceeds along a novel route in that it is suggested to shape a colorless melt stream and a dyed melt stream, respectively, into a sheet of a desired width Ba and Bb, respectively, and to melt such sheets together prior to exiting from the nozzle along a lateral edge, to obtain a sheet having a width Ba+Bb; and to introduce, along a width Bc, calculated from the transition line of the dyed sheet, into the zone of the colorless sheet, a wedge-like extending colored band made up of a partial stream of the dyed melt stream, by way of a slot die (fishtail dye, flat extrusion die, or flat sheeting die) arranged, as seen in the extrusion direction, upstream of a back pressure plate and downstream of a distributor duct, this slot die having a wedge-shaped outlet orifice, with corresponding displacement of the colorless melt stream. Thus, according to the process of this invention, a wide sheet is produced containing a zone of undyed sheeting and a zone of completely dyed sheeting with the inclusion of a transition zone of dyed and undyed melt in the shape of a color wedge band. In this connection, the transition zone, wherein a dyed melt stream of varying cross section and correspondingly different color intensity is incorporated from one side by displacement of the colorless melt stream, is likewise produced by means of a slot die. The slot die makes it possible to produce an exact, colored zone dimensioned of a corresponding cross section in accordance with the length and/or width of the nozzle orifice; due to the configuration of the slot die, it is possible to maintain the same exit speed of the dyed melt over the entire width of the desired colored band, even with a differing thickness of the same. Moreover, this makes it possible to provide the desired, exact control of the colored band.

The basic construction of a slot die is described, for example, in "Kunststoff-Maschinenführer" [Plastics Machine Guide], Carl Hanser publishers, Munich - Vienna, 1979, pages 95–98. The apparatus for the production of a sheet containing a colored band and exhibiting varying color intensity, according to this invention, has the feature, in a further development of the conventional devices, that the injection port for the additional colored thermoplastic melt is fashioned as a small slot die arranged, as seen in the extrusion direction, on the front side of the back pressure plate of the large slot die and a nozzle plate disposed in front thereof, with a nozzle exit orifice extending at right angles to the extrusion direction along the forward edge of the back pressure plate. The feeding of the additional melt stream according to this invention therefore takes place downstream of the distributor duct, i.e. after the primary melt stream has been completely spread out in the transverse direction over the entire desired width of the sheet and is flowing, in the zone of the back pressure plate, already in parallel along the entire width in the extrusion direction. The forward edge of the back pressure plate is simultaneously utilized according to this invention as the nozzle orifice rim for the additional melt stream and is transformed in this region into a small slot die within the entire slot die tool, by attaching in front a nozzle plate exhibiting the worked-in configuration of the desired nozzle or die in accordance with the size of the nozzle plate. The apparatus of this invention has the substantial advantage over the known injection nozzles, torpedoes, or other essentially round or oval, tubular injection devices, that also for the melt to be injected, a distribution of the mass flow to a desired cross section is effected in such a way that upon termination of the distribution step, the exit speed of the additional melt stream is the same at any point at the exit orifice, due to the use of a correspondingly shaped tool or die, so that frictionless merging with the already present mass stream takes place.

An advantageous further development of the invention provides that the back pressure plate of the large slot die tool exhibits a feed bore with a connecting bore to the small slot die for the partial melt stream. Depending on the shape of the slot die, it can be fed asymmetrically or symmetrically, depending also on the configuration of the die orifice and the desired cross section.

A preferred embodiment of the small slot die provides that the slot die is incorporated unilaterally into a nozzle plate with a distributor duct, a baffle, and a nozzle orifice. This distributor plate is then attached to the front edge of the back pressure plate and forms therewith, in the worked-in region, the flow channel for the partial melt stream.

In order to obtain a colored band having a wedge shape in cross section, the provision is made according to the invention that the nozzle orifice of the small slot die is of a wedge-like configuration and is reduced over its length from a given slot width to zero, but wherein the slot die is fashioned so that the partial melt stream exhibits the same exit speed over the entire length of the nozzle outlet orifice. According to th invention, the nozzle orifice of the small slot die is made to be adjustable, for example by a corresponding adjustability of the nozzle plate, for example by means of screws, shims, and similar elements.

A preferred embodiment of the apparatus according to this invention for the production of colored bands of varying color intensity in a melt stream, wherein a sheet is produced having a colorless sheet zone and a dyed sheet zone and a transition zone, provides that two slot die tools of identical geometry and optionally different nozzle widths, each being fed by respectively one extruder with a melt stream, are arranged in side-by-side relationship and are connected with each other in such a way that a continuous die orifice is provided having a width constituting the total of the individual die widths, and further provides that the injection port, fashioned as a small slot die, projects, starting with the transition line of the adjacently arranged slot die tools, over a desired width into a partial zone of one slot die tool and is connected, by way of a feed duct, with the melt stream of the other slot die tool.

The preferred area of utilization for the invention is the manufacture of sheeting or films based on polyvinyl butyral, employed as intermediate films for safety glass in automotive vehicles and in the building industry.

The invention will be explained in greater detail with reference to an embodiment illustrated in the accompanying drawings wherein:

FIG. 8 shows a cross section of the slot die made up of back pressure plate and nozzle plate according to FIG. 7;

FIG. 9 shows a view from the top of the slot die according to FIG. 8;

FIG. 10 shows a view of the nozzle plate according to section taken along line C—C of FIG. 9, and FIG. 11 shows a view E onto the slot die of FIG. 8.

Figure 1:
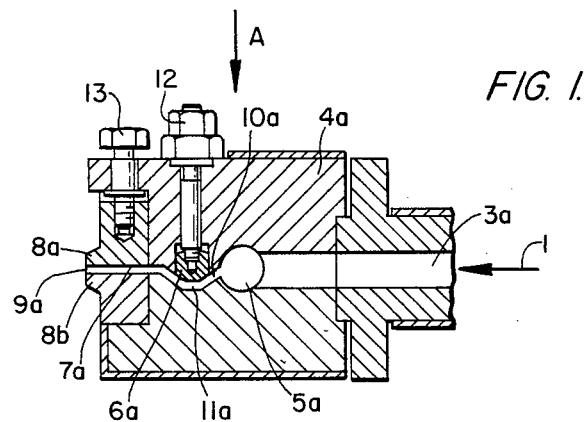
FIG. 1 shows a cross section through a conventional slot die tool.

FIG. 1 shows a schematic view of a slot die tool or fishtail die 4a wherein the melt stream 1 coming from the extruder enters the feed duct 3a and then is divided to the desired width by way of the distributor duct 5a. The distributor duct 5a is followed by a throttle zone 10a, a duct of constant gap height with a gap length reduced in accordance with the mass pressure, wherein the flow of material is controlled; at the end of this zone of the channel, the channel passes over into the forward zone 11a in the region of the back pressure plate 6a and subsequently into the nozzle orifice zone 7a. By adjusting the back pressure plate by means of the tension and pressure screw 12, corresponding flow corrections can be effected in this range; analogous considerations apply regarding the region of the nozzle outlet zone, which is likewise adjustable by screw 13 by way of the adjustable upper lip 8a. The molded melt then leaves the slot die tool at the nozzle outlet orifice 9a defined by the upper lip 8a and a lower lip 8b.

Figure 2:
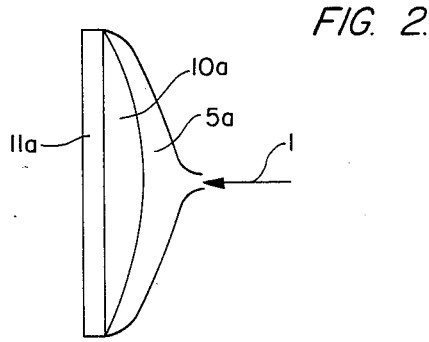
FIG. 2 shows a view A of the flow cross section of the slot die tool according to FIG. 1 in a schematic illustration.

In FIG. 2, a schematic view is illustrated of the configuration of the flow duct cross section from the entrance of the melt via the distributor duct 5a, the throttle zone 10a, and the forward zone 11a in the region of the back pressure plate.

Figure 3:
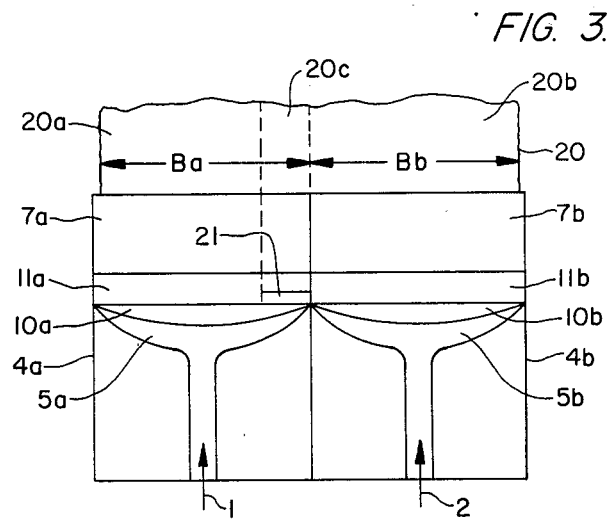
FIG. 3 shows a top view of a flow cross section of two slot die tools, arranged side-by-side, in a schematic view.

It is possible according to this invention to fashion two large slot die tools in such a way, and couple them in such a manner, that a superwide sheet can be produced of identical or different, unicolored or differently colored synthetic resin. The essential factor here is that the slot die tools 4a, 4b exhibit the same geometry with respect to the configuration of the flow cross section, but can exhibit differing widths Ba, Bb. The melts 1 and 2 are preferably based on the same thermoplastic synthetic resin, but are dyed differently or are colorless and dyed, respectively. The sheet zones 20a, 20b are then of a corresponding character and are combined into a unitary sheet 20. In order form a zone of colored band 20c in the sheet 20, use is made of a separate slot die 21 in one of the slot die tools 4a, 4b; in the embodiment of FIG. 3 this separate slot die is in the slot die tool 4a. Preferably, the slot die 21 is provided in the transition zone from one tool 4a to the other tool 4b; this is, however, dependent exclusively on the desired arrangement and design of the colored band zone 20c.

Figure 4:
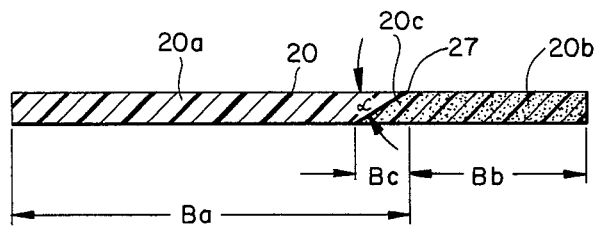
FIG. 4 shows a cross section through a sheet with a colorless zone, a dyed zone, and a transition zone.
Figure 5:
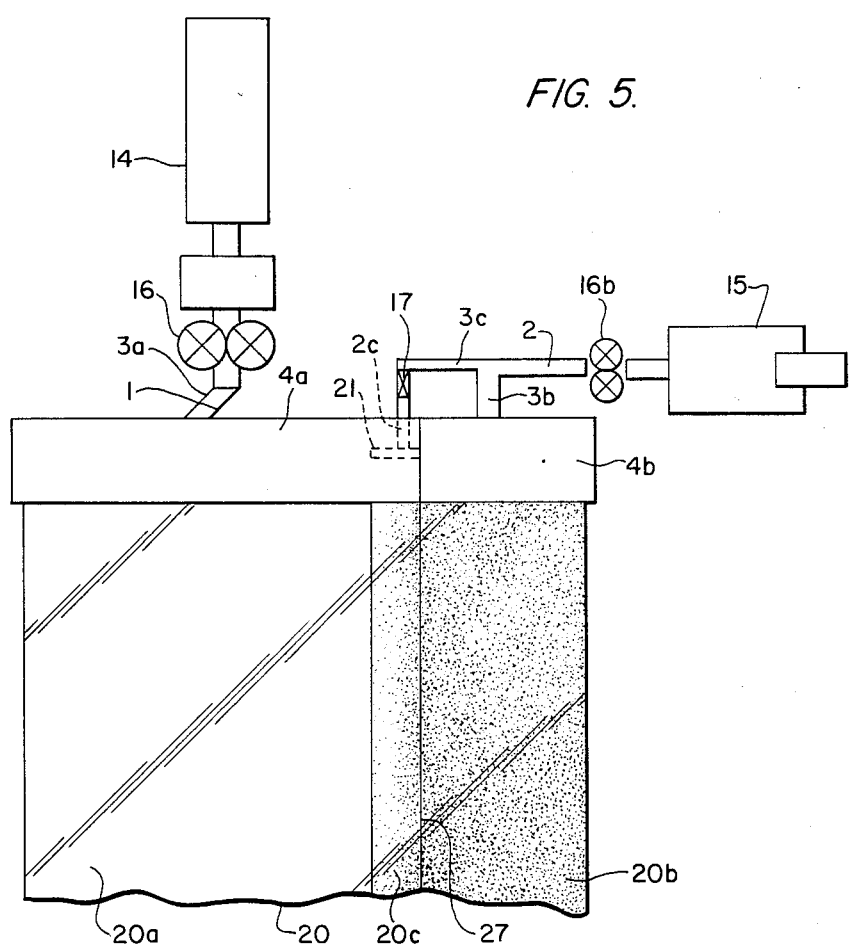
FIG. 5 shows a schematic elevational view of an installation for the manufacture of a sheet according to FIG. 4.

FIG. 4 shows a preferred embodiment of a sheet, especially based on polyvinyl butyral, produced by extrusion with a colored band, illustrated in cross section. In this arrangement, a sheet 20 is produced having a width Ba+Bb exhibiting a colorless zone 20a and a dyed zone 20b. In the transition region from the dyed sheet 20b to the undyed sheet 20a, as seen from the transition line 27, a colored band is provided having a color intensity that decreases in the direction toward the colorless sheet, i.e. the sheet zone 20c extending preferably in a wedge shape under the angle α, within an angular range of preferably 3°-20°. The associated extrusion dies are designed in correspondence with this sheet zone with colored band 20c, having a width Bc, as can be seen from the embodiment of an installation shown schematically in FIG. 5. In this arrangement, the colorless melt stream 1 is plasticized by means of extruder 14 and fed via melt pumps 16 and feed duct 3a to the first slot die tool 4a. In the second extruder 15, the colored plastic melt 2 is melted and fed via the melt pumps 16b and feed duct 3b to the second slot die tool 4b. A partial melt stream 2c for the colored band of varying color intensity is branched off from the melt stream 2 via conduit 3c and fed, for example by means of a melt pump 17, to the slot die 21 additionally installed in the tool 4a in order to form the colored band 20c in the sheet 20.

Figure 6:
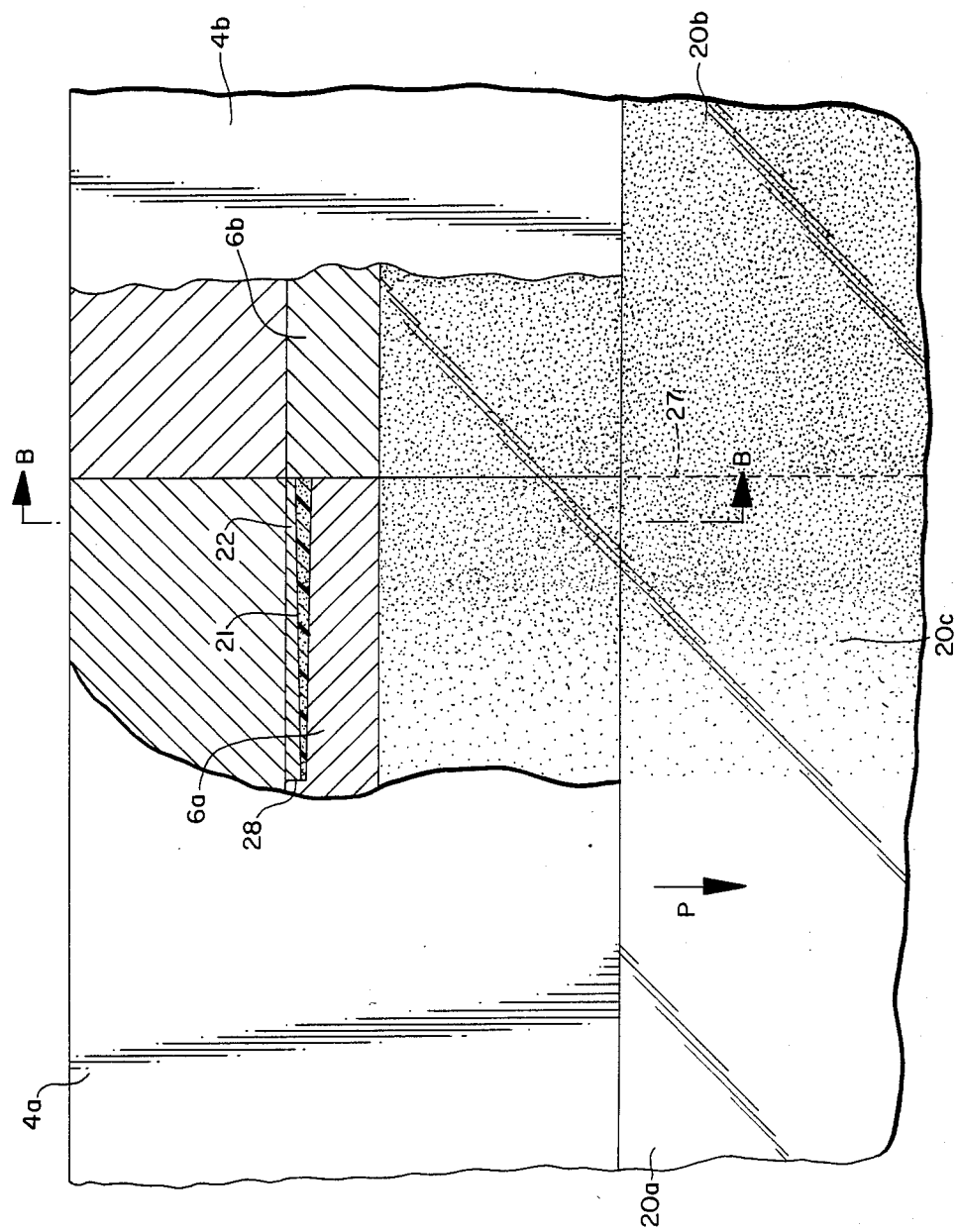
FIG. 6 shows a fragmentary elevational view of the opened slot die tools of FIG. 5 in the region of feeding of the partial stream for the colored band.
Figure 7:
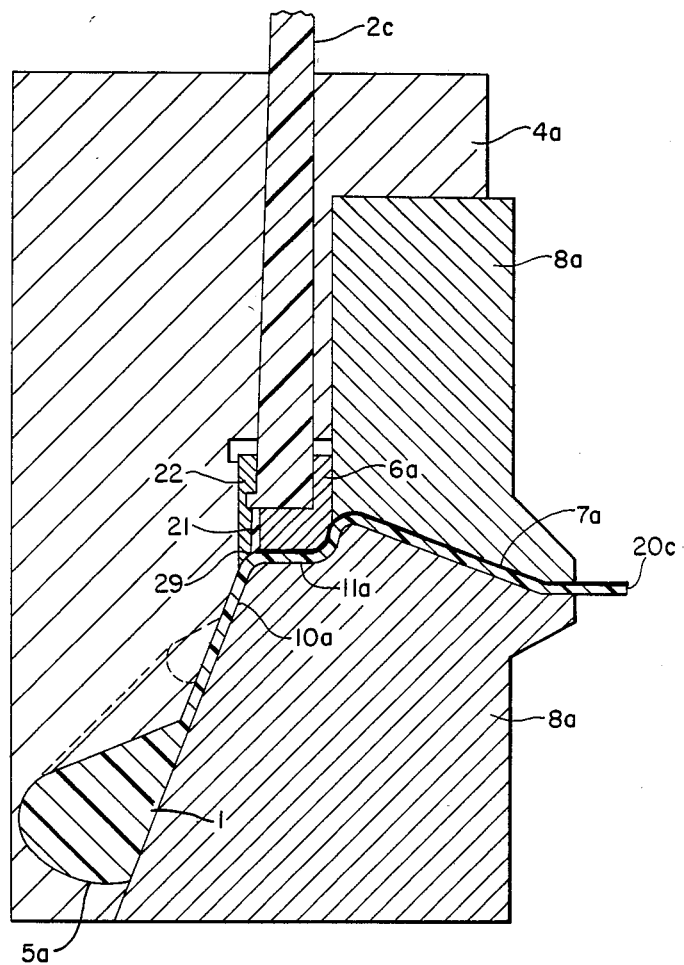
FIG. 7 shows a view of a cross section taken along line B—B according to FIG. 6.

FIGS. 6 and 7 show the construction of the slot die 21 and its installation in the large slot die tool 4a in a fragmentary illustration in greater detail. It can be seen from the plan view of FIG. 6 how the slot die tool 4a for the colorless sheet 20a and the slot die tool 4b for the colored sheet 20b are arranged directly side-by-side, one passing over into the other, wherein the contact area of the tools 4a, 4b simultaneously forms the transition line 27 between the two sheet regions 20a, 20b. The arrow P indicates the extrusion direction for the sheet 20; as seen in the extrusion direction, the additional slot die 21 for the injection of a partial stream of dyed melt into the zone of the colored melt is arranged upstream of the back pressure plate 6a. For this purpose, the back pressure plate 6a can be formed, for example, with a recess 28 in which is inserted a nozzle plate 22 with the formation of the flow cross section for the slot die 21. FIG. 7 then shows the formation of the slot die 21 in the zone of the tool 4a in a vertical cross section. The colorless melt 1 comes from the distributor duct 5a and is uniformly distributed over the throttle zone so that the colorless melt 1, when entering the forward zone 11a in the region of the back pressure plate, flows in parallel to the extrusion direction along the full desired width of the sheet. At the front edge 29 of the back pressure plate 6a, the die orifice for the partial melt stream 2c is formed along the desired width from the slot die 21. The partial melt stream 2c is fed, for example, through a recess in the back pressure plate 6a to the flow cross section of the slot die 21. The flow cross section of the slot die 21 is formed by the die plate 22 attached to the front side of the back pressure plate, leaving a corresponding space for flow cross sections, for example by means of screws, not shown.

FIGS. 8-11 illustrate an embodiment for the structure of the slot die 21 for feeding a partial melt stream into a primary melt stream already flowing in distributed form in a slot die. FIG. 8 illustrates, in an enlarged view, again a cross section through the back pressure plate 6a of FIG. 7, with a cutout opening or port 30 for feeding the melt stream and a passage opening 23 into the flow cross section of the slot die 21. The flow cross section of the slot die 21 is formed between the front side of the back pressure plate 6a and the die plate 22 mounted in front thereof; the die orifice 24 extends along the edge 29 of the back pressure plate 6a. In FIG. 9, a plan view is illustrated of the back pressure plate and nozzle plate of FIG. 8. In this illustration, it can also be seen that it is advantageous to insert the nozzle plate 22 in a recess 28 of the back pressure plate 6a. The section D—D according to FIG. 9 corresponds to the cross section of FIG. 8. FIG. 10 shows how the flow cross section is worked out of the die plate 22 according to section line C—C of FIG. 9. The flow cross section of the slot die 21 comprises essentially the distributor duct 211, the baffle 210 with the function of a throttle area, and the nozzle orifice 24. The length L of the die orifice 24 is selected in dependence on the desired width of the introduced colored band within the sheet.

Preferably, a wedge-shaped nozzle orifice 24 is chosen, as can be seen from FIG. 11, wherein the orifice tapers wedge-like from the greatest width 241 down to zero on the opposite end 240. With such a configuration of the die orifice 24, a unilateral feeding arrangement, as shown in FIG. 9, is advantageous.

The installation of an additional slot die into a slot die tool, according to this invention, for the introduction of a melt differing in color in order to produce a colored band of defined color intensity and defined sizes, is possible with two coupled-together slot die tools, as in the illustrated example, but can also be accomplished with the use of only one large slot die tool provided with appropriate feed means and flow regulating channels.

What is claimed is:

1. A process for producing a sheet exhibiting a colored band of varying color intensity, wherein a melt stream of a thermoplastic synthetic resin plasticized in an extruder is fed to a slot die tool and spread out by way of a distributor duct with throttle zone in the transverse direction to the sheet extrusion direction, and then traverses, in parallel to the extrusion direction, a height-adjustable forward zone up to the nozzle orifice, and wherein another melt stream of dyed or colored thermoplastic synthetic resin is injected into this melt stream upstream of the nozzle orifice, characterized in that a colorless melt stream and a dyed melt stream are shaped respectively into sheets each of a desired width Ba and Bb, respectively, and prior to exiting from the die, are melted together along a lateral edge into a sheet 20 having a width Ba+Bb; and in that there is introduced, along a width Bc, calculated from a transition line of the dyed sheet, into the region of the colorless sheet a wedge-like extending colored band from a partial stream of the dyed melt stream by way of a slot die having a wedge-shaped orifice and arranged, as seen in the extrusion direction, upstream of a back pressure plate and downstream of the distributor duct, with a corresponding displacement of the colorless melt stream.

2. An apparatus for producing a sheet containing a colored band, with an extruder for melting a stream of thermoplastic synthetic resin and with a slot die tool having a distributor duct with a throttle zone located upstream thereof, with a back pressure plate, with a forward zone formed between an upper lip and a lower lip including a wide nozzle orifice to shape the sheet, wherein the slot die tool furthermore comprises an injection port for an additional, thermoplastic partial melt stream; said injection port comprising a small slot die as seen in the extrusion direction positioned at the forward side of the back pressure plate of the slot die tool and a nozzle plate attached in front thereof, with a narrow nozzle orifice extending at right angles to the extrusion direction along the front edge of the back pressure plate.

3. An apparatus according to claim 2, wherein the back pressure plate has a feed bore with a connecting bore to the slot die for the partial melt stream.

4. An apparatus according to claim 2, wherein the slot die is worked unilaterally into the nozzle plate with a distributor duct, a baffle, and the narrow nozzle orifice.

5. An apparatus according to claim 3, wherein the slot die is worked unilaterally into the nozzle plate with a distributor duct, a baffle, and the narrow nozzle orifice.

6. An apparatus according to claim 2, wherein the narrow nozzle orifice is of a wedge shape and is reduced over its length L from a predetermined slot width to zero, but wherein the slot die is configured in such a way that the partial melt stream is provided with the same exit speed over the entire length of the narrow nozzle orifice.

7. An apparatus according to claim 2, wherein the nozzle plate is adjustable and thus the narrow nozzle orifice is adjustable.

8. An apparatus according to claim 2, wherein two slot die tools of identical geometry, optionally of differing nozzle widths, each of which is fed by an extruder with a melt stream, are arranged in side-by-side relationship in such a way that a continuous wide nozzle orifice is provided, with a width constituting the total of the individual nozzle widths, and the slot die extends, starting with the transition line that extends between the adjacently arranged slot die tools over the width Bc into a partial zone of one slot die tool and is connected by way of a feed channel to the melt stream of the other slot die tool.

* * * * *